United States Patent [19]

Ihlenfeld et al.

[11] 4,070,109

[45] Jan. 24, 1978

[54] PROCESS FOR MAKING CHANGES ON PHOTOPRINT FILM

[75] Inventors: Arnold O. Ihlenfeld, Berlin; Heribert Morgott, Munich, both of Germany

[73] Assignee: Firma H. Berthold AG, Berlin, Germany

[21] Appl. No.: 590,843

[22] Filed: June 26, 1975

[30] Foreign Application Priority Data

July 11, 1974 Germany ............................ 2433823

[51] Int. Cl.[2] ........................ G03B 27/32; G03C 5/04

[52] U.S. Cl. .................................... 355/77; 96/27 R; 96/41

[58] Field of Search ................. 355/40, 43, 77; 96/41, 96/42, 43, 27

[56] References Cited

U.S. PATENT DOCUMENTS

| | | | |
|---|---|---|---|
| 2,740,324 | 4/1956 | Cahill | 355/40 |
| 3,669,666 | 6/1972 | Kleitman et al. | 96/41 |
| 3,717,975 | 2/1973 | Bloom | 96/41 |
| 3,890,148 | 6/1975 | Lawson et al. | 96/41 |
| 3,902,901 | 9/1975 | Vogel | 96/41 |

FOREIGN PATENT DOCUMENTS

| | | | |
|---|---|---|---|
| 2,210,021 | 8/1973 | Germany | 96/43 |

OTHER PUBLICATIONS

Langford, Basic Photography, 1965, pp. 316–317.

*Primary Examiner*—Mary F. Kelley

*Attorney, Agent, or Firm*—Arthur J. Hansmann

[57] ABSTRACT

A process for making changes on photoprint film by placing a red coloring mask over spots on a film to be corrected, and with the mask being impenetrable by short wave length light. Next, photographically projecting the film so that the colored spots are not projected, and then photographically projecting another film, with the corrections thereon, and projecting it on the firstmentioned film, all so that the final film is a corrected film accomplished through the use of placing a red coloring mask to prevent projecting of portions of the film to be corrected.

5 Claims, 5 Drawing Figures

Fig. 1

GEHEN NACH ORTEN,
DIE DURCH GEHEN NICHT ERREICHT WERDEN KÖNNEN,
MUSS MA SICH ABGEWÖHNEN.
REDEN ÜBER ANGELEGENHEITEN,
DIE DURCH REDEN NICHT ENTSCHEIDEN WERDEN KÖNNEN,
MUSS MAN SICH ABGEWÖHNEN.
DENKEN ÜBER PROBLEME,
DIE DURCH DENKEN NICHT GELÖRT WERDEN KÖNNEN,
MUSS MAN SICH ABGEWÖHNEN,
SAGTE ME-TI. BERTOLT BRECHT

Fig. 2

GEHEN NACH ORTEN,
DIE DURCH GEHEN NICHT ERREICHT WERDEN KÖNNEN,
MUSS MA SICH ABGEWÖHNEN.
REDEN ÜBER ANGELEGENHEITEN,
DIE DURCH REDEN NICHT ENTSCHEIDEN WERDEN KÖNNEN,
MUSS MAN SICH ABGEWÖHNEN.
DENKEN ÜBER PROBLEME,
DIE DURCH DENKEN NICHT GELÖRT WERDEN KÖNNEN,
MUSS MAN SICH ABGEWÖHNEN,
SAGTE ME-TI. BERTOLT BRECHT

Fig. 3

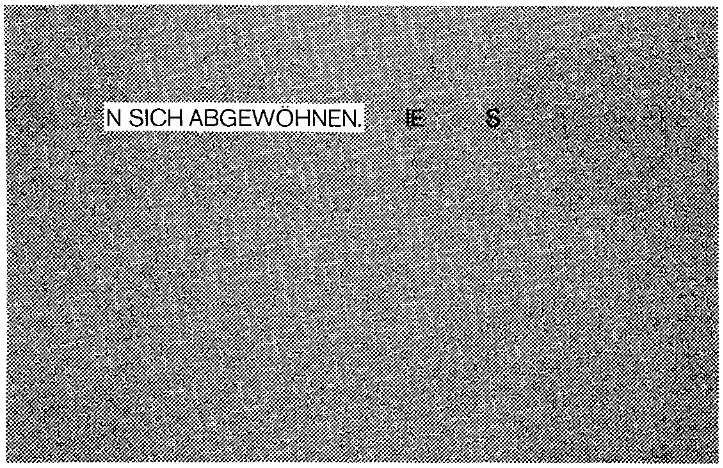

Fig. 4

GEHEN NACH ORTEN,
DIE DURCH GEHEN NICHT ERREICHT WERDEN KÖNNEN,
MUSS MA[redacted]. IE S
REDEN ÜBER ANGELEGENHEITEN, 1
DIE DURCH REDEN NICHT ENTSCH[redacted]DEN WERDEN KÖNNEN,
MUSS MAN SICH ABGEWÖHNEN.
DENKEN ÜBER PROBLEME,
DIE DURCH DENKEN NICHT GELÖ[redacted]T WERDEN KÖNNEN,
MUSS MAN SICH ABGEWÖHNEN,
SAGTE ME-TI. BERTOLT BRECHT

Fig. 5

GEHEN NACH ORTEN,
DIE DURCH GEHEN NICHT ERREICHT WERDEN KÖNNEN,
MUSS MAN SICH ABGEWÖHNEN.
REDEN ÜBER ANGELEGENHEITEN,
DIE DURCH REDEN NICHT ENTSCHIEDEN WERDEN KÖNNEN,
MUSS MAN SICH ABGEWÖHNEN.
DENKEN ÜBER PROBLEME,
DIE DURCH DENKEN NICHT GELÖST WERDEN KÖNNEN,
MUSS MAN SICH ABGEWÖHNEN,
SAGTE ME-TI. BERTOLT BRECHT

PROCESS FOR MAKING CHANGES ON PHOTOPRINT FILM

This invention relates to a process for changing and/or correcting positive film material for photoprint, whereby the place to be corrected in a printed indicia is covered and replaced photographically by the correct one.

BACKGROUND OF THE INVENTION

A finished specimen of indicia set forth in the usual way by use of lead characters is relatively easily corrected after its completion, since lead characters in their solid state are easily interchanged. The problems become intrinsically more difficult with a finished photoprint which is in the form of positive film material. Not only can a symbol once set forth on a light sensitive material no longer be changed on this film, but the symbols and pictures on the film material have no projection surfaces or aligning surfaces, so that corrections must be brought into the proper position either visually or by exposing with additional superimposed markings.

With the so-called smooth print, as long as it is set on large phototype-setting machines which make use of computer data carriers, such as perforated tapes or the like, the correction can be undertaken on devices known as band-fusing fixtures. That process is truly fairly straightforward and also proceeds without great expenditure of time, since it need not be accomplished by visual means, that is by eye control; it can nonetheless be practiced only with very elaborate technical correction machines. Even with phototype-setting machines, the final corrections in actual practice are accomplished by a manual visual process.

With the prior art correction processes which are performed visually, the sections of film in the range of the spot to be corrected will be cut out and glued together after correction, or the spot to be corrected on the film material will be scraped by hand, and a correspondingly large film section with the correction will be pasted over it. The pasting or splicing of film materials still has the disadvantage that even if a relatively thin, so-called stripping film, is brought over the abraded spot to be corrected, the then superimposed copy of the corrected indicia shows the marks of the cut edges in the lighted direction which can't be avoided due to the light reflections along these edges. An attempt was sought to avoid such marks by use of a so-called diffusing foil, which causes a specific diffusion of the light rays. But, by this means, the sharpness of the image is decidedly diminished and a longer time of photographic exposure is required. Only in the instance when photoprint negatives are used for producing photoprint films for printing, or where positives are used as intermediate negatives, is it possible to retouch or remove the cutting edge markings manually by brush and ink. No further argument is needed that this prior art work must be carried out with greatest precision and skill, and thus it represents additional time-consuming operations which must be performed by specially trained personnel.

It should further be observed that the known cutting out of spots to be corrected on a given indicia, whether it is executed manually or with a specially designed fixture, requires as much skill and expenditure of time as the above-mentioned retouching or removing of cutting edge marks with brush and ink. Much patience and skill is also needed for the correction of lines of indicia on photoprint films if the spot to be corrected on the film has been scraped and the resulting bare film surface must be corrected visually by hand with a network of lines.

Advantageously with the familiar cutting out of the faulty spot in the indicia and the subsequent pasting in of the correction, it is clearly seen that the change can be observed during each step in the process, so that one can see at each moment what is being changed. The present invention provides an improved method whereby a correction can be undertaken on positive photoprint film material without requiring time-consuming scraping, cutting, or pasting on the spot to be corrected.

BRIEF DESCRIPTION OF THE DRAWINGS

FIG. 1 is a view depicting indicia on a film with any words thereon but showing places to be corrected.

FIG. 2 is a view of the film with the indicia of FIG. 1 and indicating red coloring over spots to be corrected.

FIG. 3 is a film with the corrected indicia.

FIG. 4 is a view of the film of FIG. 2 but having alignment marks thereon.

FIG. 5 is a view of the final corrected film.

DETAILED DESCRIPTION OF THE PREFERRED PROCESS

The novelty of this idea will be seen by noting that for the restoration of the final negative or positive films, the covering of the spot to be corrected in the indicia, or in a section of a picture, is undertaken by red-coloring, whereby the reddening completely covers every detail of the place to be corrected, yet the coloring is so confined that a covering mask, for the demarcation at the neighboring symbols around the spot to be corrected or the like, with the cuttings of a correction film to be inserted at this spot, if necessary, is larger than and spaced from the area of the coloring when projected, and the reddening and mask, while possibly making an optical alignment visually obvious, are unobvious with exposure by the projection light used for this purpose. For the covering mask, a visually transparent red-tinted commercial cover foil can be used and/or the reddening can easily be undertaken by means of a particular well-known felt-tipped pen. This process of making corrections on positive photo-print films requires no particular well-equipped work place and no particular skill. The use of commercial cover films or a red-writing felt-tipped pen is considerably time-saving compared to the customary cutting and pasting process. From the positive samples of the photoprint material according to the requirement of the printing process under consideration, either a final corrected negative film or a positive film can be furnished directly. During the correction process through the use of red-tinted materials, like a felt-tipped ink pen, the corrected area is visible by virtue of the transparency of the color, thus the color is transparent and permits black print or the like to be seen through it by the unaided eye. Thereby the symbols to be substituted can be neatly laid over each other and visually aligned. A so-called blank space results, as if it were produced by scraping of the place to be corrected. It is advantageous for the insertion of the correction to use a relatively easy to develop fixture which permits the indicia of the original film to be visually aligned with the correction film, to be exposed afterwards for projection on a new corrected film.

Besides the optimum visual conditions which result from the correction process according to the invention, and the simple methods which are required for the accomplishment of the process, it is also advantageous that no sort of intermediate films or diffusing foils or post-retouching and other time-consuming correcting procedures are required.

Markings during projection of a corrected copy can only occur if the copy possesses cutting edges which when struck by the projection light, prevent, due to reflection, an even exposure. On the other hand, no deficiency in quality of the script or the like results by double exposure, so long as no boundary zones are struck during the projection, as is the case if the places to be corrected remain transparent, but they remain impenetrable for the short wavelength projection light. Commercially available cover foils developed by industry for negative film corrections are equipped with a light adhesive layer which may simplify the proposed process further. With smaller areas to be covered and corrected, it is especially advantageous to apply instead of the cover foil, a short wavelength light impenetrable red of a felt-tipped pen, for the transparent character.

For alignment of the correcting strip and the film strip to be corrected, for correctly positioned copy, it may be advantageous that the films be supplied with a perforated index, which will be engaged by aligning pins. However, if the complete film strip must be used for the indicia, and the perforation would produce a reduction of the film area to be used, then it is particularly advantageous to paste a strip, such as paper, with a perforated index. With the use of such strips it is also of advantage that cutting of the film material is eliminated and damages to the material are reduced to a reasonable minimum. It is also recommended to paste on the same sort of index strips to unexposed film material, so that an aligned copy is assured if a correction should be required later. The alignment of the strip is achieved with a simple fixture which consists of a plate with a required number of index pins and which has a double alignment feature for the film.

The accompanying drawings assist in the understanding of this process in which the steps of the process are presented. As shown in FIG. 1, a marking of corrections in the incorrectly presented indicia of the example is undertaken. FIG. 2 shows that the incorrect indicia, as apparent in the drawing, is then covered on the film by either reddening completely with a red felt-tipped pen or with some other red coloring, as shown by the hatched area at the end of line 3, for instance. In this way, the word or the like to be corrected still remains completely visible to the eye. This so-called original film will be transferred in a fixed position over an unexposed photographic film, whereby, in combination with a filter, the red areas on the original film prevent an exposure of the second film, and this second film, shown in its final form in FIG. 5, is then exposed at its uncolored area.

From FIG. 3, the next step in the process will be seen, according to which the correction film is made to contain the corrected section of the indicia, as shown in the white area which is located according to the original film, and, in covering the surroundings of this section of the indicia, the first film can be covered and this white section will have a length and width that it will be somewhat larger than or the same size as the red space on the first film. The corrected film is then exposed on the second film to produce FIG. 5. For instance, on a transparent screen with horizontal and vertical demarcation lines 1 there is a covering seen to be matched, as shown in FIG. 4.

In the next step of the process, the original film is attached to a translucent screen. This position corresponds to the hitherto fixed location during the superimposing exposure. Now the correction section will be projected onto the translucent screen, so that the correction can be visibly brought to its projection location by shifting of the correction film together with its cover.

FIG. 4 shows the visual state on the translucent screen on which only the original film is attached, while the correction section is projected onto this screen.

In the last step of the process the correction text will finally be exposed on the new film. FIG. 5 shows the newly produced film.

What is claimed is:

1. In a process for photographically changing positive film material having indicia thereon and employed in photoprinting, the steps of first photographically projecting only certain portions of a first film onto certain portions of a photographically unexposed blank area in the remaining unprojected portion of said second film, thereafter photographically projecting a third film onto said blank area of said second film, and developing said double exposed second film, the improvement comprising the steps of identifying an area of the indicia to be changed on said first film and covering said area with a red color mask impenetrable to a photographic exposure short wave length light while leaving the covered indicia visible, photographically projecting said first film onto said second film to have said red colored area of said first film leave said blank area on said second film, making said third photographic film with a photographic light-penetrable section thereon having new indicia to be substituted for said area to be changed on said first film, said section being of a size larger than the size of said area covered with said red color mask to extend fully beyond the boundaries of said covered area, visually aligning on a viewing screen said third film in an alignment for photographically projecting onto said second film to match the projection position of said first film onto said second film to thereby fully cover said blank area of said second film with said light-penetrable section of said third film by positioning said third film onto said first film in the projecting position in which the second film had been photographically exposed relative to said first film, photographically exposing only said third film onto said second film to have said new indicia of said third film exposed in said blank area of said second film to thereby produce said second film with a composite of said first film and said third film.

2. The process as claimed in claim 1, wherein said first film has its said area to be changed covered with red transparent foil which provides said red color mask.

3. The process as claimed in claim 1, wherein said first film has its said area to be changed covered with red transparent liquid which provides said red color mask.

4. The process as claimed in claim 3, wherein said red transparent liquid is applied by a red felt-tipped pin.

5. The process as claimed in claim 1, wherein said first film and said third film are respectively aligned by tangible means for their respective photographic exposure to said second film, and such means include perforations on said films and alignment pins extending into said perforations.

* * * * *

UNITED STATES PATENT OFFICE

CERTIFICATE OF CORRECTION

PATENT NO. : 4070109

DATED : January 24, 1978

INVENTOR(S) : Arnold O. Ihlenfeld and Heribert Morgott

It is certified that error appears in the above-identified patent and that said Letters Patent are hereby corrected as shown below:

In Claim 1, Line 5, after "unexposed", insert -- second film while leaving a photographically unexposed --

Signed and Sealed this

*Ninth* Day of *May 1978*

[SEAL]

*Attest:*

RUTH C. MASON
*Attesting Officer*

LUTRELLE F. PARKER
*Acting Commissioner of Patents and Trademarks*